June 6, 1967 E. P. SKOV 3,324,250
OSCILLATOR-AMPLIFIER CIRCUIT UTILIZING RECORDING AMPLIFIER
FOR HIGH FREQUENCY RECORDING BIAS SUPPLY
Filed Sept. 24, 1962 2 Sheets-Sheet 1

ERLING P. SKOV
INVENTOR.
BY Robert G. Clay
ATTORNEY

ERLING P. SKOV
INVENTOR.

BY Robert G. Clay

ATTORNEY

United States Patent Office 3,324,250

Patented June 6, 1967

3,324,250

OSCILLATOR-AMPLIFIER CIRCUIT UTILIZING RECORDING AMPLIFIER FOR HIGH FREQUENCY RECORDING BIAS SUPPLY

Erling Peter Skov, San Mateo, Calif., assignor to Ampex Corporation, Redwood City, Calif., a corporation of California Filed Sept. 24, 1962, Ser. No. 225,633
6 Claims. (Cl. 179—100.2)

This invention relates to an oscillator-amplifier circuit for magnetic tape recording, and more particularly to an oscillator-amplifier circuit in which the recording amplifier is used to supply a high frequency recording bias having minimum distortion and maximum amplitude stability.

In magnetic tape recording of intelligence signals, such as audio signals, it has been found that the quality of recording is greatly improved and that noise in the recording is considerably reduced by superimposing a high frequency bias signal on the intelligence signal. Moreover, the quality of recording can be further improved by minimizing harmonic distortion in the high frequency recording bias signal and by stabilizing its amplitude.

In the past, oscillator-amplifier circuits have been used in which the recording bias signal is supplied by the recording amplifier. However, this type of oscillator-amplifier circuit had a disadvantage in that the high frequency recording bias signal supplied by the recording amplifier had a high level of harmonic distortion. An additional disadvantage of this circuit is that the amplitude of the high frequency recording bias signal varied substantially with variations in supply voltage. Furthermore, prior oscillator-amplifier circuits were very complex and expensive since the recording amplifier utilized two or more amplifying devices. Thus, this type of oscillator-amplifier circuit was unsatisfactory in certain applications, particularly in high quality audio recording where it is essential to use a recording bias signal having minimum distortion and maximum amplitude stability.

It is, therefore, the principal aim of this invention to provide a simple and inexpensive oscillator-amplifier circuit that does not have the disadvantages and limitations of prior oscillator-amplifier circuits. The circuit of the present invention is comprised of one amplifying device connected in a cathode-follower configuration and a resonant network consisting of a split inductor and a capacitor. The split inductor of the resonant network is coupled in positive feedback relationship with the amplifying device to cause the amplifying device to oscillate at a high frequency. The relatively large negative feedback of the cathode-follower amplifying device minimizes harmonic distortion in the oscillatory signal and reduces variations in its amplitude caused by variations in supply voltage. An intelligence signal to be recorded is coupled to the control electrode of the amplifying device through the resonant network. The oscillatory signal is superimposed on the intelligence signal as it is being amplified in the amplifying device, and then both signals are simultaneously applied to a magnetic head, which is coupled to the output electrode of the amplifying device. Thus, the quality of recording is greatly improved by having the recording amplifier device supply a high frequency recording bias signal having minimum distortion and whose amplitude is independent of variations in supply voltage. Accordingly, the unique and novel arrangement of the present invention provides a simple and inexpensive oscillator-amplifier circuit that is very desirable for high quality audio recording.

It is, therefore, the principal object of this invention to provide an improved oscillator-amplifier circuit for magnetic tape recording.

Another object of this invention is to provide an improved oscillator-amplifier circuit in which the recording amplifier is used to supply a high frequency recording bias having minimum distortion and maximum amplitude stability.

A further object of this invention is to provide an improved oscillator-amplifier circuit that is inexpensive and utilizes few components.

The foregoing and other objects, features and advantages of the invention will be apparent from the following particular description of the invention, especially when taken in conjunction with the accompanying drawings in which.

Figure 1:
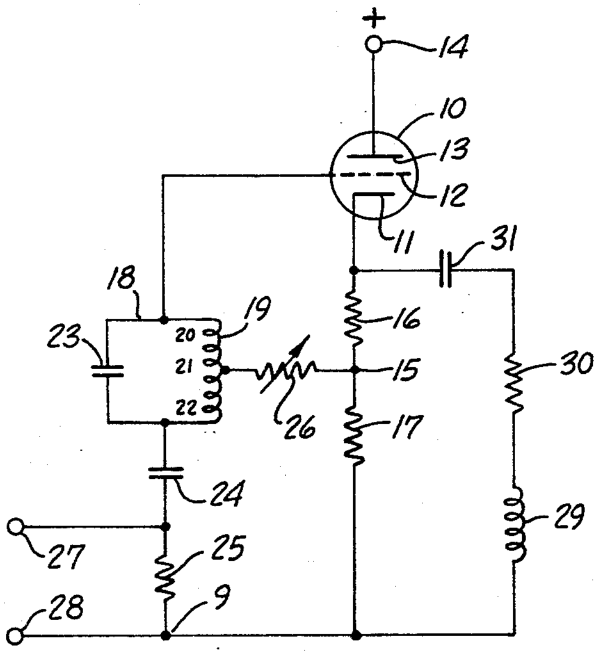
FIGURE 1 is a schematic diagram of the preferred embodiment of the oscillator-amplifier circuit employing a vacuum tube amplifying device.

Referring now to FIGURE 1, the oscillator-amplifier circuit is comprised of an amplifying tube 10 having a cathode electrode 11, a grid electrode 12 and an anode electrode 13. The amplifying tube 10 is connected in a cathode-follower configuration by coupling the anode electrode 13 to the positive terminal of the power supply 14. The cathode electrode 11 of the amplifying tube 10 is coupled to a ground terminal 9 through a bias resistor 16 and a load resistor 17. Resistor 16 provides a D.C. bias for the amplifying tube 10.

A parallel resonant network 18 comprising a split inductor 19 and a capacitor 23 is coupled to the grid electrode 12 of the amplifying tube 10. The split inductor 19 of the resonant network 19 consists of a series combination of windings 20–21 and 21–22. One end of the parallel resonant network 18 is connected to the grid electrode 12 of the amplifying tube 10 while the other end is coupled to the ground terminal 9 through blocking capacitor 24 and input resistor 25. The tap 21 of the split inductor 19 is coupled to the common terminal 15 between resistors 16 and 17 through an adjustable resistor 26. The split inductor 19 of the resonant network 18 functions as an autotransformer to provide positive feedback between the cathode electrode 11 and the grid electrode 12 of the amplifying tube 10, thereby causing the amplifying tube 10 to oscillate at a high frequency. Since the voltage gain of the cathode-follower amplifying tube 10 is less than one, the autotransformer 19 is arranged to step up the voltage being fed back so that the high frequency oscillations will be sustained. The frequency of the oscillations is determined by the values of the components 19 and 23 of the parallel resonant network 18 and its amplitude is adjusted by adjusting resistor 26.

By connecting the amplifying tube 10 in the cathode-follower configuration, there is provided a relatively large negative feedback between the cathode electrode 11 and the grid electrode 12. Harmonics generated by the oscillating amplifying tube 10 are reduced by the large negative feedback of cathode-follower amplifying tube 10. Furthermore, the large negative feedback reduces variations in the amplitude of the high frequency signal caused by variations in supply voltage. Thus, the recording amplifier tube 10 of the oscillator-amplifier circuit supplies a high frequency recording bias signal having minimum distortion and maximum amplitude stability.

A magnetic head winding 29 is coupled to the output circuit of the amplifying tube 10 by connecting one of its ends to the cathode electrode 11 through series-connected resistor 30 and capacitor 31 and the other end to the ground terminal 9. Resistor 30 improves recording of low frequency signals and the capacitor 31 blocks the D.C. components from the magnetic head winding 29. An intelligence signal to be recorded is applied to input terminals 27 and 28, which are connected across input resistor 25. The oscillatory signal is superimposed on the intelligence signal as it is being amplified by the amplifying tube 10, and then both signals are simultaneously applied to the magnetic head winding 29. Thus, the recording amplifier tube 10 of the oscillator-amplifier circuit is used to amplify an intelligence signal and also to supply a high frequency recording bias signal.

In operation, the power supply 14 is connected to the anode electrode 13 of amplifying tube 10 of FIGURE 1. The split inductor 19 functions as an autotransformer to provide positive feedback between the cathode electrode 11 and the grid electrode 12, thereby causing the amplifying tube 10 to break into oscillations. The value of the components 19 and 23 of the parallel resonant network 18 are chosen so that the frequency of the oscillations of the amplifying tube 10 will be sufficiently higher than the frequencies of an intelligence signal, such as an audio signal. The output voltage at the cathode electrode 11 follows very closely the voltage of the grid electrode 12, and therefore the relatively large negative feedback of the cathode-follower amplifying tube 10 minimizes harmonic distortion in the oscillatory signal and reduces variations in its amplitude caused by variations in supply voltage. The audio signal is applied to the input terminals 27 and 28 and appears across the input resistor 25. The audio signal is then coupled to the grid electrode 12 of amplifying tube 10 through blocking capacitor 24 and parallel resonant network 18. The oscillatory signal generated by amplifying tube 10 is superimposed on the audio signal as it is being amplified by the amplifying tube 10, and then both signals are simultaneously applied to the magnetic head winding 29. The oscillatory signal serves as a high frequency recording bias during recording of the audio signal. Thus, the quality of recording is greatly improved by having the recording amplifier of an oscillator-amplifier circuit supply a high frequency recording bias signal having minimum distortion and whose amplitude is independent of variations in power supply.

Figure 2:
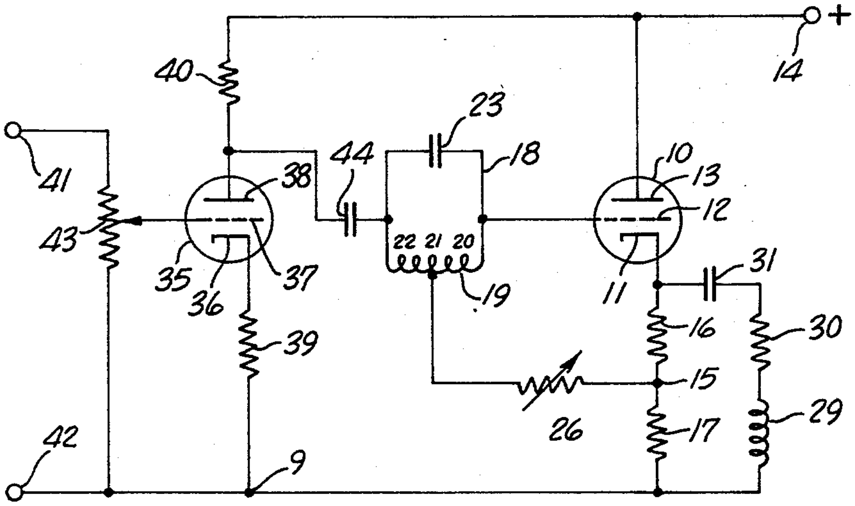
FIGURE 2 is a schematic diagram of an alternative embodiment of the oscillator-amplifier circuit, which utilizes an additional vacuum tube amplifying device for amplifying intelligence signals.

In FIGURE 2, the intelligence signal is amplified by an amplifying tube 35 before it is applied to the amplifying tube 10. The amplifying tube 35 consists of a cathode electrode 36, a grid electrode 37 and an anode electrode 38. The cathode electrode 36 is coupled to ground terminal 9 through a current-limiting resistor 39 while the anode electrode 38 is coupled to the positive terminal of power supply 14 through load resistor 40. The intelligence signal is applied to input terminals 41 and 42, which are connected to a voltage divider 43. The tap of the voltage divider 43 is connected to the grid electrode 37 of the amplifying tube 35. Thus, the intelligence signal is amplified by the amplifying tube 35 and then applied to the grid electrode 12 of amplifying tube 10 through the coupling capacitor 44 and the parallel resonant network 18. The oscillator-amplifier circuit of FIGURE 2 operates similar to the circuit of FIGURE 1.

Figure 3:
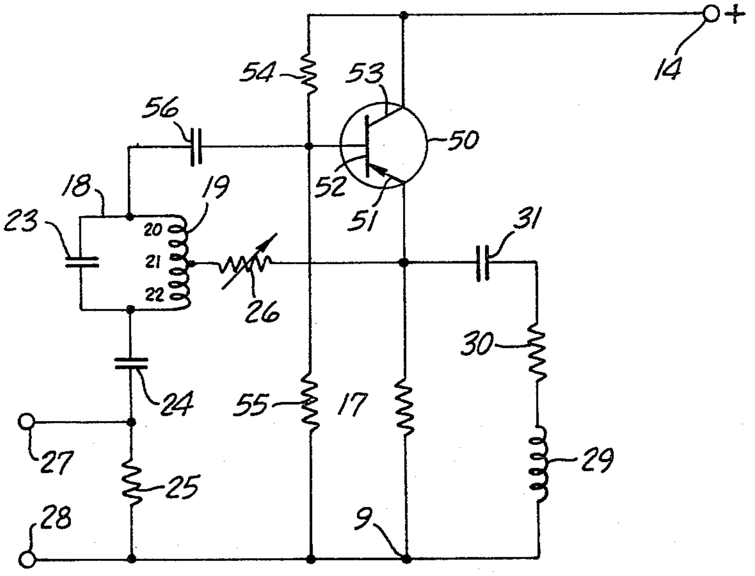
FIGURE 3 is a schematic diagram of a modification of the oscillator-amplifier circuit of FIGURE 1 employing a transistor amplifying device.

FIGURE 3 shows a transistorized oscillator-amplifier circuit which follows generally, in its mode of operation, the principles of the circuit of FIGURE 1. The recording amplifier of the oscillator-amplifier circuit is comprised of a PNP transistor 50 having an emitter electrode 51, a base electrode 52 and a collector electrode 53. A voltage divider consisting of resistors 54 and 55 is coupled to the base electrode 52 to provide a bias for the transistor 50. The intelligence signal is coupled to the base electrode 52 of transistor 50 through parallel resonant network 18 and coupling capacitor 56.

Figure 4:
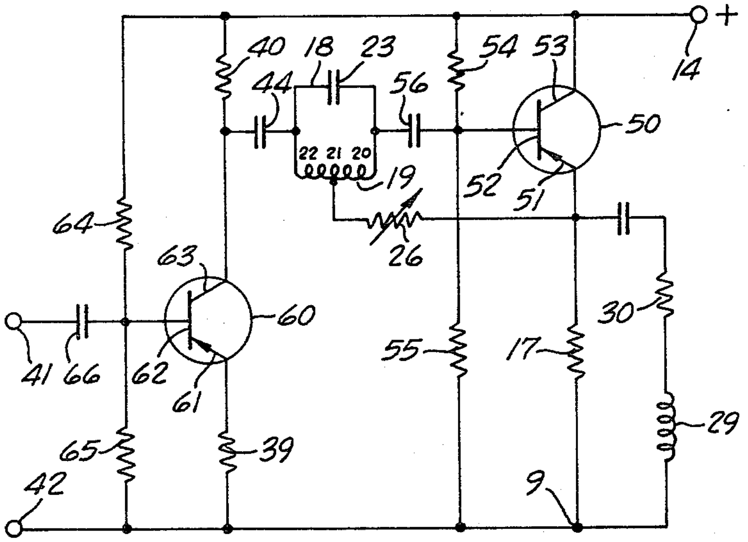
FIGURE 4 is a schematic diagram of a modification of the oscillator-amplifier circuit of FIGURE 2 employing transistor amplifying devices.

FIGURE 4 shows a transistorized oscillator-amplifier circuit, which follows generally, in its mode of operation, the principles of the circuit of FIGURE 2. Before the intelligence signal is applied to the PNP transistor 50, it is amplified by a PNP transistor 60 having an emitter electrode 61, a base electrode 62 and a collector electrode 63. A voltage divider consisting of resistor 64 and 65 is coupled to the base electrode 62 to provide a bias for the transistor 60. The intelligence signal is coupled to the base electrode 62 of transistor 60 through capacitor 66. The intelligence signal, therefore, is amplified by the amplifying transistor 60 and then applied to the base electrode 52 of amplifying transistor 50 through coupling capacitors 44 and 56 and parallel resonant network 18.

Thus, it is seen that the unique and novel arrangement of the present invention provides a simple and inexpensive oscillator-amplifier circuit that is very desirable for high quality recording. Although the embodiments shown in FIGURES 3 and 4 have illustrated transistors 50 and 60 to be PNP conductivity type transistors, it is appreciated that NPN conductivity type transistors may also be employed with corresponding changes in potential requirements.

Although the present invention has been shown and described in terms of a preferred embodiment, changes and modifications which do not depart from the inventive concepts taught herein will suggest themselves to those skilled in the art. Such changes and modifications are deemed to fall within the scope of the invention.

What is claimed is:

1. An oscillator-amplifier circuit for magnetic recording comprising:

an amplifying tube connected in a cathode follower configuration, said amplifying tube having a cathode electrode, a grid electrode and an anode electrode;

positive feedback means coupled between the cathode electrode and the grid electrode to cause said amplifying tube to oscillate to produce a high frequency signal and to superimpose the high frequency signal on an intelligence signal applied to the grid electrode of said amplifying tube; and a magnetic head coupled to the cathode electrode of said amplifying tube for receiving both signals.

2. An oscillator-amplifier circuit for magnetic recording comprising:

an amplifying transistor connected in a common-collector configuration, said amplifying transistor having an emitter electrode, a base electrode and a collector electrode;

positive feedback means coupled between the emitter electrode and the base electrode for sending said amplifying transistor oscillatory to produce a high frequency signal and to superimpose the high frequency signal on an intelligence signal applied to the base electrode of said amplifying transistor; and a magnetic head coupled to the emitter electrode of said amplifying transistor for receiving both signals.

3. An oscillator-amplifier circuit for magnetic recording comprising:

an amplifying tube connected in a cathode follower configuration, said amplifying tube having a cathode electrode, a grid electrode and an anode electrode;

a resonant network including a split inductor with a tap coupled to the grid electrode of said amplifying tube, the tap of said split inductor coupled to the cathode electrode of said amplifying tube;

said split inductor coupled in a positive feedback relationship with said amplifying tube to cause said amplifying tube to oscillate to produce a high frequency signal and to superimpose the high frequency signal on an intelligence signal coupled to the grid electrode of said amplifying tube through said resonant network; and a magnetic head coupled to the cathode electrode of said amplifying tube for receiving both signals.

4. An oscillator-amplifier circuit for magnetic recording comprising:
- an amplifying transistor connected in a common-collector configuration, said amplifying transistor having an emitter electrode, a base electrode and a collector electrode;
- a resonant network including a split inductor with a tap coupled to the base electrode of said amplifying transistor, the tap of said split inductor coupled to the emitter electrode of said amplifying transistor;
- said split inductor coupled in a positive feedback relationship with said amplifying transistor for rendering said amplifying transistor oscillatory to produce a high frequency signal and to superimpose the high frequency signal on an intelligence signal coupled to the base electrode of said amplifying transistor through said resonant network; and
- a magnetic head coupled to the emitter electrode of said amplifying tube for receiving both signals.

5. An oscillator-amplifier circuit for magnetic recording comprising:
- an amplifying tube connected in a cathode-follower configuration, said first amplifying tube having a cathode electrode, a grid electrode and an anode electrode;
- a resonant network including a split inductor with a tap coupled to the grid electrode of said first amplifying tube, the tap of said split inductor coupled to the cathode electrode of said first amplifying tube;
- a second amplifying tube coupled to said first amplifying tube through said resonant network for amplifying an intelligence signal;
- said split inductor coupled in a positive feedback relationship with said first amplifying tube to cause said first amplifying tube to oscillate to produce a high frequency signal and to superimpose the high frequency signal on the amplified intelligence signal applied to the grid electrode of said first amplifying tube; and
- a magnetic head coupled to the cathode electrode of said first amplifying tube for receiving both signals.

6. An oscillator-amplifier circuit for magnetic recording comprising:
- a first amplifying transistor connected in a common-collector configuration, said first amplifying transistor having an emitter electrode, a base electrode and a collector electrode;
- a resonant network including a split inductor with a tap coupled to the base electrode of said first amplifying transistor, the tap of said split inductor coupled to the emitter electrode of said first amplifying transistor;
- a second amplifying transistor coupled to said first transistor through said resonant network for amplifying an intelligence signal;
- said split inductor coupled in a positive feedback relationship with said first amplifying transistor to cause said first amplifying transistor to oscillate to produce a high frequency signal and to superimpose the high frequency signal on the amplified intelligence signal applied to the base electrode of said first amplifying transistor; and
- a magnetic head coupled to the emitter electrode of said first amplifying transistor for receiving both signals.

References Cited

UNITED STATES PATENTS

| | | | |
|---|---|---|---|
| 2,427,491 | 9/1947 | Blumlein | 331—183 |
| 2,730,577 | 1/1956 | Winters | 330—91 |
| 3,133,160 | 5/1964 | Catto | 179—100.2 |

OTHER REFERENCES

Pages 150, 152, and 153, 1957—Elements of Tape Recorder Circuits, Burstein & Pollak, Gernsback Library, Inc.

Pages 351, 1957—Elements of Magnetic Tape Recording, Haynes, Prentice Hall, Inc., Englewood Cliffs, N.J.

BERNARD KONICK, *Primary Examiner.*

L. G. KURLAND, *Assistant Examiner.*